US008180876B2

(12) United States Patent
Kato

(10) Patent No.: US 8,180,876 B2
(45) Date of Patent: May 15, 2012

(54) DEVICE MANAGER AND DEVICE MANAGEMENT PROGRAM

(75) Inventor: Hiroshi Kato, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 193 days.

(21) Appl. No.: 12/407,778

(22) Filed: Mar. 19, 2009

(65) Prior Publication Data
US 2009/0248861 A1   Oct. 1, 2009

(30) Foreign Application Priority Data
Mar. 25, 2008  (JP) ................. 2008-078110

(51) Int. Cl.
*G06F 15/173* (2006.01)
(52) U.S. Cl. ................. 709/223; 709/224; 358/1.15
(58) Field of Classification Search .............. 709/223, 709/224; 358/1.15
See application file for complete search history.

(56) References Cited

U.S. PATENT DOCUMENTS

| | | | |
|---|---|---|---|
| 6,122,639 A | 9/2000 | Babu et al. | |
| 6,981,036 B1* | 12/2005 | Hamada | 709/223 |
| 7,039,724 B1* | 5/2006 | Lavian et al. | 709/250 |
| 7,779,420 B1* | 8/2010 | Puttu et al. | 719/318 |
| 2002/0143936 A1* | 10/2002 | Yu | 709/224 |
| 2003/0041134 A1 | 2/2003 | Sugiyama et al. | |
| 2004/0006611 A1* | 1/2004 | Yi | 709/222 |
| 2004/0233854 A1* | 11/2004 | Suzuki | 370/242 |
| 2005/0053016 A1 | 3/2005 | Kawai et al. | |
| 2005/0105132 A1* | 5/2005 | Hagiuda | 358/1.15 |
| 2005/0165834 A1* | 7/2005 | Nadeau et al. | 707/103 R |
| 2006/0182042 A1* | 8/2006 | Nasu | 370/254 |
| 2007/0180086 A1* | 8/2007 | Fang et al. | 709/223 |
| 2007/0234057 A1* | 10/2007 | Miyazawa | 713/175 |
| 2008/0028079 A1* | 1/2008 | Yang et al. | 709/227 |
| 2008/0107131 A1* | 5/2008 | Ma | 370/468 |
| 2008/0140822 A1* | 6/2008 | Torii | 709/223 |
| 2009/0070447 A1* | 3/2009 | Jubinville et al. | 709/223 |

FOREIGN PATENT DOCUMENTS

| | | |
|---|---|---|
| JP | 2000-196665 A | 7/2000 |
| JP | 2002-288056 A | 10/2002 |
| JP | 2002-312260 A | 10/2002 |
| JP | 2004-005553 A | 1/2004 |

(Continued)

OTHER PUBLICATIONS

Hamada Noboru, "Detailed Description", JP 2000-196665 Jul. 2000.*

(Continued)

*Primary Examiner* — Oanh Duong
(74) *Attorney, Agent, or Firm* — Baker Botts L.L.P.

(57) ABSTRACT

A device manager and a computer readable medium storing a device management program are provided. The device manager includes a transmission unit that transmits, to devices connected to a network, a broadcast command which requests management information that is stored in and unique to each device for use in communication using a first communication protocol that enables communication using authenticated and encrypted data; a determination unit that determines whether the devices are devices to be managed, on the basis of the management information received in response to the broadcast command; and an information acquisition unit that transmits, using the first communication protocol, to the devices determined by the determination unit to be devices to be managed among the plurality of devices, read data for reading information about the device in order to acquire information about the device.

9 Claims, 9 Drawing Sheets

FOREIGN PATENT DOCUMENTS

| | | |
|---|---|---|
| JP | 2006-252023 A | 9/2006 |
| JP | 2007-257525 A | 10/2007 |
| JP | 2007-257527 A | 10/2007 |
| JP | 2008-146410 A | 6/2008 |

OTHER PUBLICATIONS

Japan Patent Office; Notification of Reason for Refusal in Japanese Patent Application No. 2008-078110 (counterpart to the above-captioned US application) mailed May 11, 2010.

European Patent Office: European Search Report in Application No. 09250777.1 (related application to the above-captioned U.S. patent application) mailed Jul. 15, 2009.

U. Blumenthal; B. Winjen; User-based Security Model (USM) for version 3 of the Simple Network Management Protocol (SNMPv3); Network Working Group, REC 3414; Dec. 2002; pp. 1-88; The Internet Society, US.

Japan Patent Office, Decision of Refusal for Japanese Patent Application No. 2008-078110 (counterpart to above-captioned patent application), dispatched Dec. 21, 2010.

* cited by examiner

FIG. 5

| CORPORATE SPECIFICATION No. | IP ADDRESS (MAC ADDRESS) | COMMUNICATION TYPE (FLAG) | COMMUNICATION ACCOUNT (FLAG) | PASSWORD (FLAG) |
|---|---|---|---|---|

| SYMBOL | MODEL No. | PRODUCT NAME | INSTALLATION LOCATION | OPERATING STATUS | DATE OF MAINTENANCE CHECK | DATE OF REPLACEMENT OF DRUM | OPERATING TIME |
|---|---|---|---|---|---|---|---|
| A | B-109 | LASER PRINTER | OFFICE ROOM 1 | IDLE | 9.3.2007 | 6.30.2007 | 60 h |
| B | S-208 | SCANNER | OFFICE ROOM 2 | IDLE | 1.10.2008 | – | 120 h |
| C | B-307 | LASER PRINTER | OFFICE ROOM 3 | JOB | 12.5.2007 | 8.20.2007 | 80 h |
| – | – | – | – | – | – | – | – |
| D | – | – | – | – | – | – | – |

DEVICE MANAGER AND DEVICE MANAGEMENT PROGRAM

CROSS-REFERENCE TO RELATED APPLICATIONS

This application claims priority from Japanese Patent Application No. 2008-078110 filed on Mar. 25, 2008, the entire contents of which are incorporated herein by reference.

TECHNICAL FIELD

Devices, apparatuses, and computer program products consistent with the present disclosure relate to a device manager for managing a plurality of devices, which are connected to each other by way of a network, by means of a computer connected to the network, as well as to a device management program for activating the computer.

BACKGROUND

A network, such as a local area network (LAN), has recently become greater in scale. A plurality of devices, such as a printer, a scanner, a multifunction device having multiple functions, and a router, are used while connected to the network. Therefore, it is advantageous to provide uniform management of a product name, a model number, an IP address, an installation location, an operating condition, and the like, of each of the devices.

JP-A-2007-257525 describes a related art device manager in the form of a computer on which network management software is run. The device manager displays a device management list showing information acquired from devices connected to a network. The device management list shows information about a device to be managed. For example, the information may include the designation of the device, an operating status, a product name, an installation location, and an IP address.

However, the related art device manager has some disadvantages. The related-art device manager transmits a broadcast command (call) to the plurality of devices by way of the network, thereby searching for devices that received the broadcast command and that are in the network. Next, a command for individually inquiring whether or not a device is a desired management target is again transmitted to all of the devices that have sent a return mail in answer to the broadcast command. On the basis of the information acquired from the devices in answer to the inquiry, devices that will become management targets are extracted and listed. However, this process has a disadvantage in that, even when acquisition of information about devices which will become management targets required by the device manager is desired, communication must be individually established with all of the devices in a case where many devices that are not management targets are in the network. Hence, the related-art device manager has a disadvantage in that much time is consumed to acquire information about the devices.

SUMMARY

Illustrative aspects of the present invention provide a device manager capable of more quickly selecting devices to be managed from a plurality of devices connected to a network, and a device management program for activating a computer.

According to an illustrative aspect of the present invention, there is provided a device manager comprising a transmission unit that transmits, to a plurality of devices connected to a network, a broadcast command which requests management information-that is stored in and unique to each device for use in communication using a first communication protocol that enables communication using authenticated and encrypted data; a determination unit that determines whether the plurality of devices are devices to be managed, on the basis of the management information received from the plurality of devices in response to the broadcast command, and an information acquisition unit that transmits, using the first communication protocol, to the devices determined by the determination unit to be devices to be managed among the plurality of devices, read data for reading information about the device in order to acquire information about the device.

According to another illustrative aspect of the present invention, there is provided a computer readable medium storing a device management program for a computer, the device management program modifying the computer to implement: a transmission unit that transmits, to a plurality of devices connected to a network, a broadcast command which requests management information that is stored in and unique to each device for use in communication using a first communication protocol that enables communication using authenticated and encrypted data; a determination unit that determines whether the plurality of devices are devices to be managed, on the basis of the management information received from the plurality of devices in response to the broadcast command; and an information acquisition unit that transmits, using the first communication protocol, to the devices determined by the determination unit to be devices to be managed among the plurality of devices, read data for reading information about the device in order to acquire information about the device.

BRIEF DESCRIPTION OF THE DRAWINGS

FIG. 5 is a view for describing an example format configuration of management information;

FIG. 6 is a view showing an example of a device management list;

DESCRIPTION OF EXEMPLARY EMBODIMENTS

Exemplary embodiments of the present invention will be described in detail hereunder by reference to the drawings.

Figure 1:
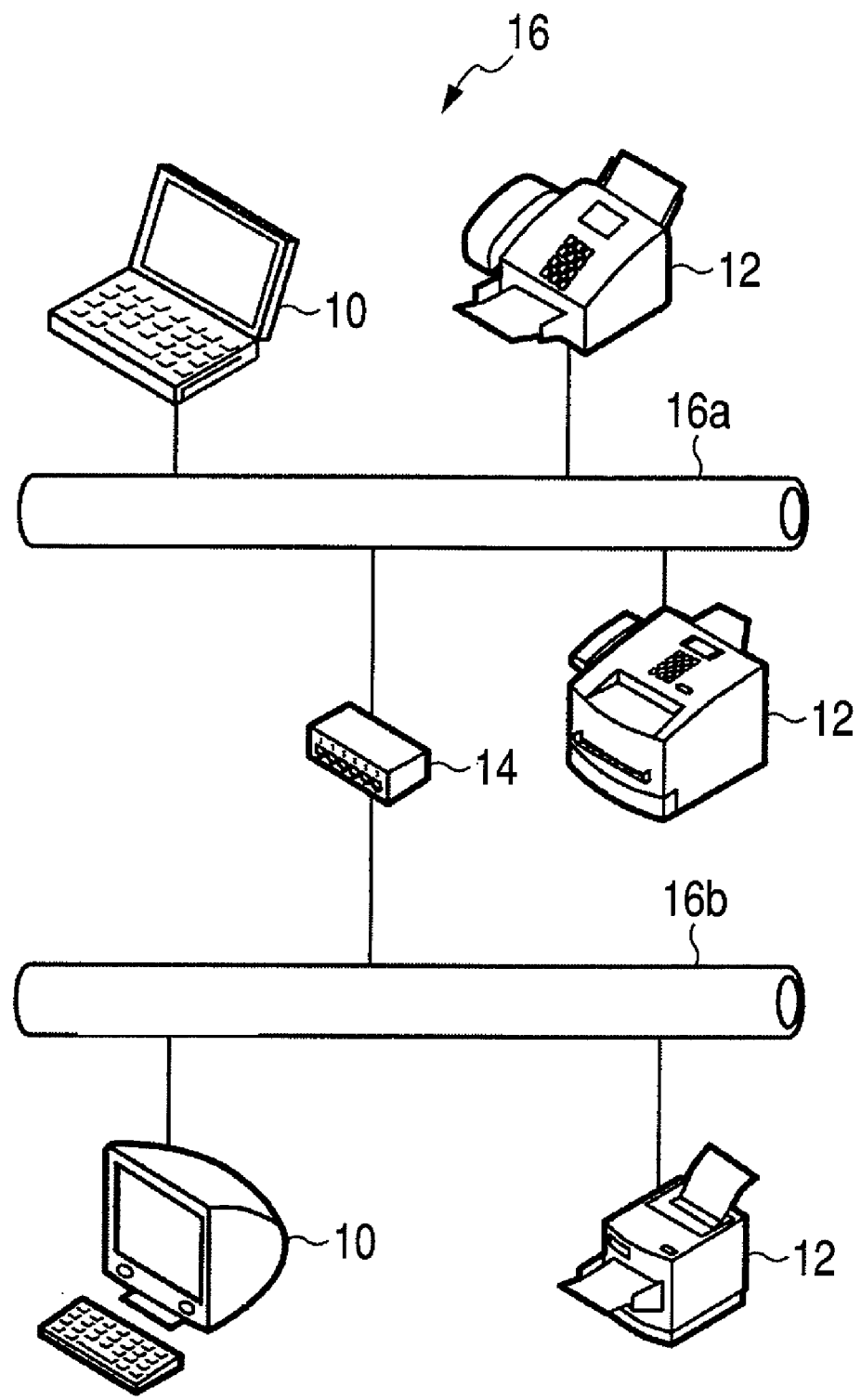
FIG. 1 is a view showing a configuration of a network to which computers according to an exemplary embodiment of the present invention acting as device managers and devices are connected.

FIG. 1 illustrates an example of a network 16 in which computers (personal computers) 10 capable of acting as a device manager according to an exemplary embodiment of the present invention are connected to and manage a plurality of devices 12. The devices 12 may be a scanner, a printer, a multifunction device having a plurality of functions, and the like. The network 16 comprises networks 16a and 16b connected to each other by means of a network device 14, which may be, for example, a router, a hub, or the like.

Figure 2:
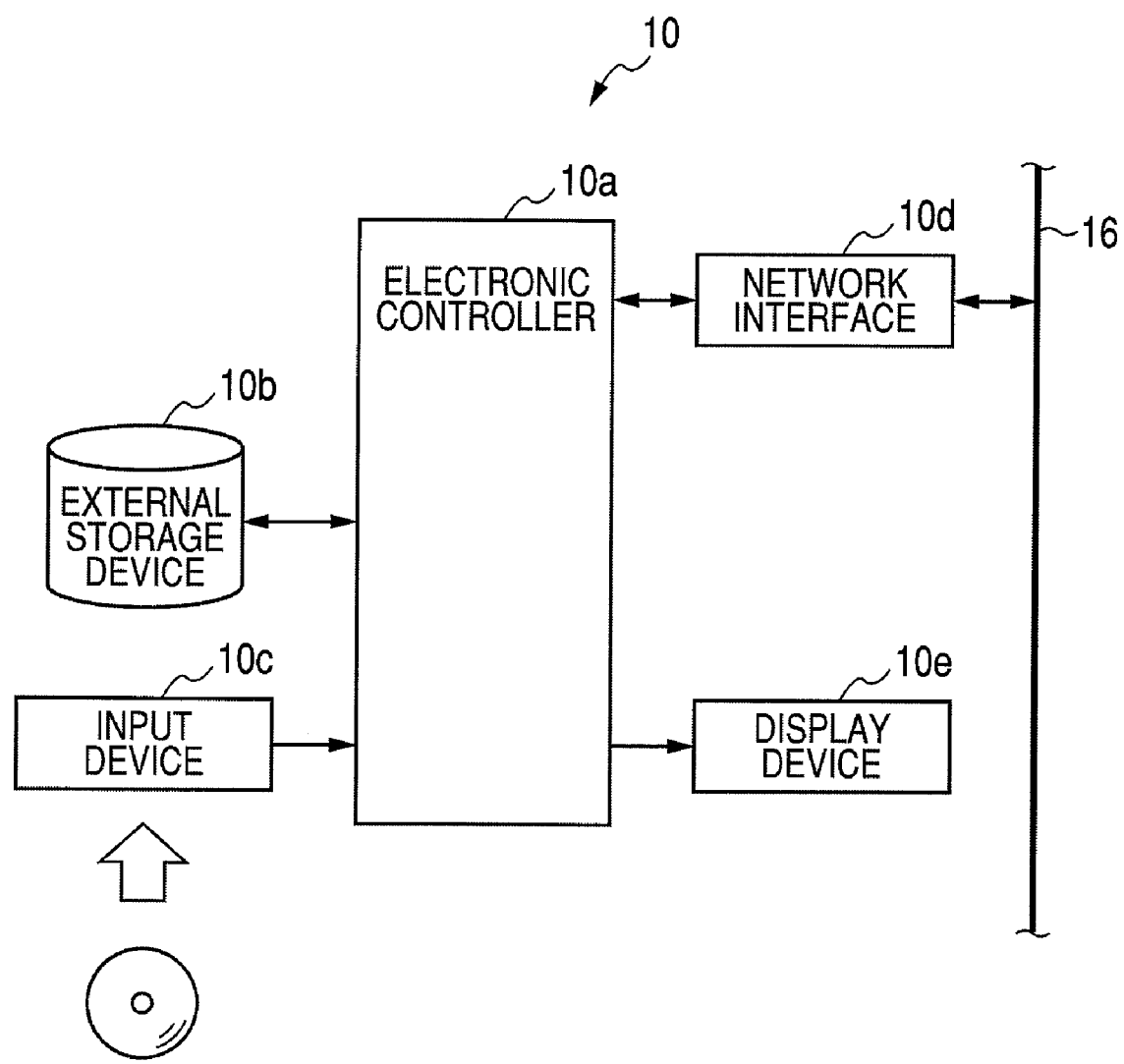
FIG. 2 is a view showing an example of a configuration of a computer shown in FIG. 1.

FIG. 2 is a view showing an example configuration of a computer 10 of FIG. 1. An electronic controller 10a is a so-called microcomputer including a central processing unit (CPU), a read only memory (ROM), a random access memory (RAM), an input/output interface, and the like. The CPU implements a device management function by processing a signal input from an input device 10c or a signal input from the network 16 by way of a network interface 10d in accordance with a program stored in an external device 10b, such as the ROM or a hard disk drive (HDD), while utilizing a temporary storage function of the RAM, and outputs a processing result to the network 16 or a display device 10e, such as a liquid-crystal display device. The input device 10c reads information input from an input device, such as a keyboard, a mouse, or the like, and information stored in a storage medium, such as a compact disc read only memory (CD-ROM), and inputs the thus-read information to the electronic controller 10a. The network interface 10d connects the computer 10 to the network 16 and enables transmission and receipt of information with another device 12 or another computer 10 connected to the network 16 by use of a communications protocol. The communications protocol may be predetermined.

Figure 3:
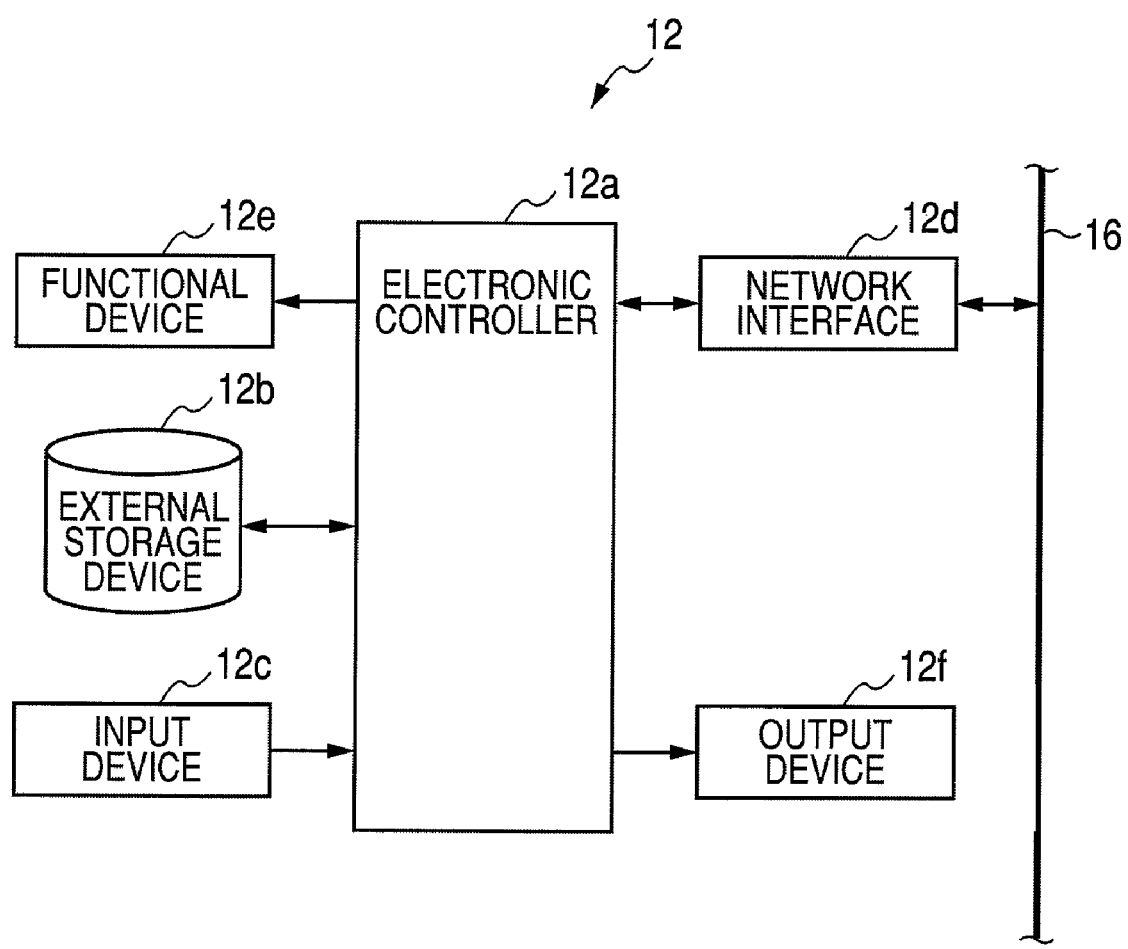
FIG. 3 is a view showing an example of a configuration of a device shown in FIG. 1.

FIG. 3 is a view showing an example configuration of a device 12 of FIG. 1. The electronic controller 12a is a so-called microcomputer including a well-known CPU, ROM, RAM, an input/output interface, and the like. The CPU processes a signal input from an input device 12c or a signal input from the network 16 by way of a network interface 12d in accordance with a program stored in an external device 12h, such as the ROM or the HDD, while utilizing a temporary storage function of the RAM, and outputs a processing result to a functional device 12e, the network 16, or a display device 12f, such as a liquid-crystal display device. A functional device 12e is provided for causing the device 12 to function in a certain way. For example, when the device 12 is a printer, the functional device 12e is a printing mechanism. When the device 12 is a scanner, the functional device 12e is an optical image reading mechanism. The network interface 12d connects the device 12 to the network 16 and enables transmission and receipt of information with another device 12 or another computer 10 connected to the network 16 by use of a communications protocol. The protocol may be predetermined.

Figure 4:
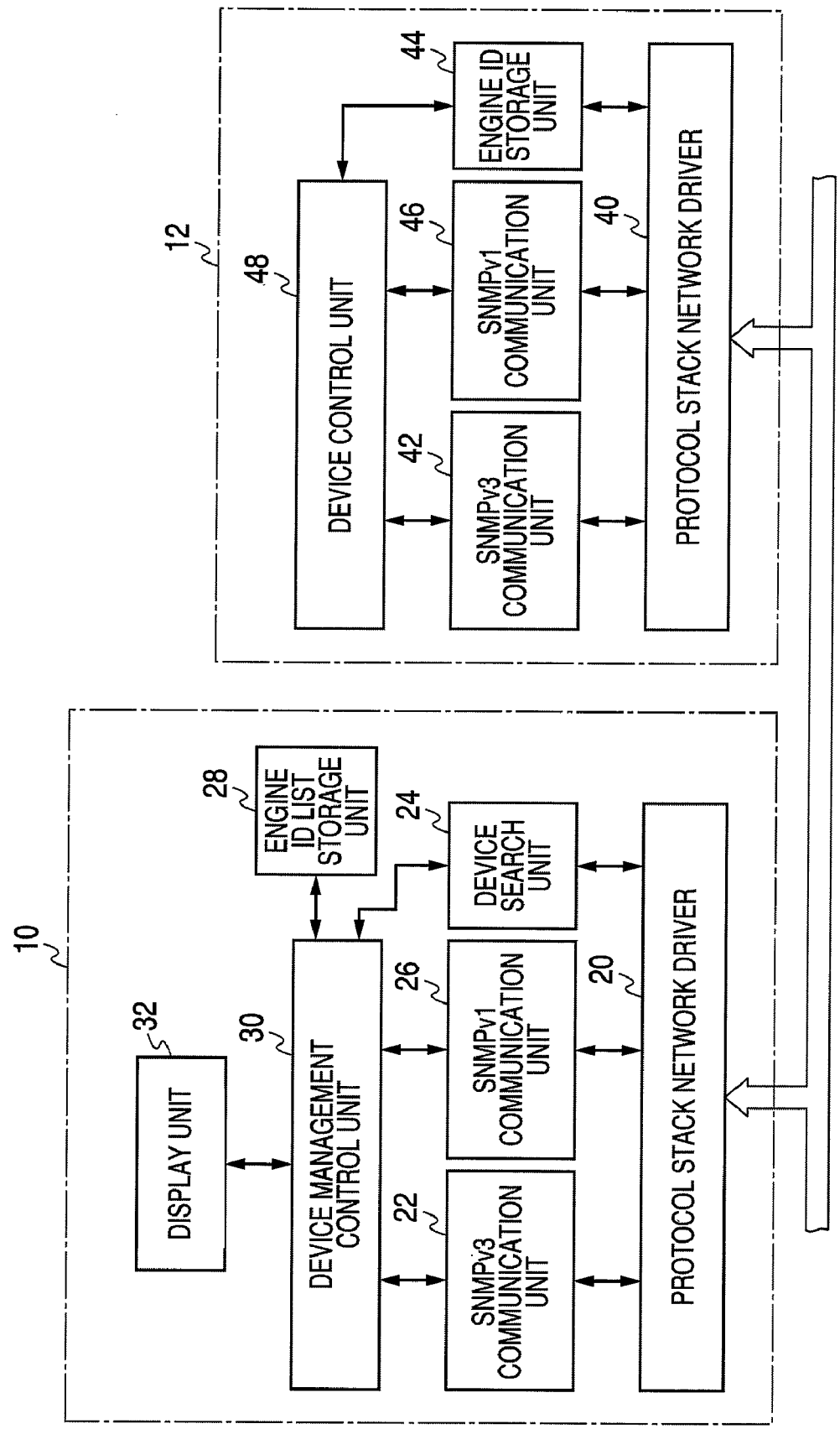
FIG. 4 is a functional block diagram which describes functions of the computer and the device shown in FIG. 1.

FIG. 4 is a functional block diagram showing an example of a control function of the computer 10 achieved as a result of the computer operating in accordance with a stored program. As shown in FIG. 4, the computer 10 includes a protocol stack network driver 20, a simple network management protocol version 3 (SNMPv3) communication unit 22; a device search unit 24; an SNMPv1 communication unit 26; an engine ID list storage unit 28; a device management control unit 30; and a display unit 32. The protocol stack network driver 20 enables establishment of communication with the device 12 or another computer 10 connected to the network 16 by use of a previously-set stratified protocol; for instance, an SNMP/UDP/IP communication protocol. Pursuant to a command from the device management control unit 30, the SNMPv3 communication unit 22 executes transmission and reception by use of the SNMPv3 communication protocol. Pursuant to a command from the device management control unit 30, the SNMPv1 communication unit 26 executes transmission and reception by use of the SNMPv1 communication protocol. The SNMPv3 protocol is defined in RFC3410 and complies with the first communication protocol that enables transmission/reception of authenticated and encrypted data. The SNMPv3 protocol is loaded with management information unique to a device; namely, an engine ID, for identifying an agent that is an installed program for performing the SNMP function. The SNMPv1 communication protocol is defined in RFC1157 and corresponds to a protocol that runs on an UDP; hence, the SNMPv1 communication protocol complies with a second communication protocol 2 that enables transmission/reception of data without advanced authentication and encryption.

FIG. 5 shows an example format of the engine ID. The engine ID includes a corporate specification number corresponding to the name of a manufacturer of the device 12; a unique MAC address or an IP address belonging to the device 12; a communication type that is a flag showing that the device 12 is set so as to be communicable by means of the SNMPv3 communication protocol; a communication account that is a flag showing that an authentication ID (an authentication symbol) for the device 12 is set and that the authentication ID is valid; and a flag showing that a password for the device 12 is set and that the password is valid. The corporate specification number may be previously set. On the basis of the engine ID, a determination is made as to whether or not the device 12 is an object of management; whether or not the SNMPv3 communication protocol is used; whether or not the device has the authentication ID; and whether or not the password is set on the device.

Turning back to FIG. 4, the device search unit 24 delivers a broadcast (e.g., a broadcast email) requesting acquisition of an engine ID to a plurality of devices 12 connected to the network 16, at a command from the device management control unit 30. The engine ID list storage unit 28 stores engine IDs transmitted (i.e., returned) from the respective devices 12. On the basis of a result of a determination as to whether or not a corporate specification number, which is included in each of the engine IDs that are transmitted (i.e., returned) from the respective devices 12 and stored in the engine ID list storage unit 28, matches a corporate number to be taken as a preset object of management, the device management control unit 30 determines whether or not the device 12 is an object of management. Namely, the device management control unit 30 performs a search, to thus extract the device 12 to be managed; and stores the list in the engine ID list storage unit 28. The computer 10 previously stores a relationship among a MAC address or an IP address for specifying each of the devices, an authentication ID of the device, and a password of the same. The device management control unit 30 transmits read data. The read data may be a request command (e.g., a GET command) to the effect that there is a desire for acquisition of information about the device 12. The information may include, for example, a product name; a model number; a year, month, and day of a replacement of toner; a year, month, and day of a replacement of a drum; a year, month, and day of a maintenance check; an installation location; an operating status; a cumulative operating time; and the like. The request command is transmitted solely to the device 12 that is an object of management determined from the engine ID. The device 12 that is an object of management is determined by use of an authentication ID and a password for the device 12; by use of either the authentication ID or the password when only one is available; or by use of neither the authentication ID nor the password when both are not available, and through the use of the SNMPv3 communication protocol. When the device 12 to be managed does not use the SNMPv3 communication protocol, a request command to the effect that acquisition of information about the device 12 is desired is sent by use of the SNMPv1 communication protocol. Upon receipt of a return email from each of the devices 12 in answer to the request command, the device management control unit 30 prepares a list showing information about the devices 12, stores the list, and causes the display unit 32 to display the list. FIG. 6 shows an example of a device management list H showing information about the device 12 to be managed.

Returning to FIG. 4, an example of a control function of the device 12 acquired as a result of the device operating in accordance with a stored program will now be described. The device 12 has a protocol stack network driver 40, an SNMPv3 communication unit 42, an engine ID storage unit 44, an SNMPv1 communication unit 46, and a device control unit 48. Similar to the protocol stack network driver 20, the protocol stack network driver 40 establishes communication with the network 16 through use of a stratified protocol, for example, an SNMP/UDP/IP communication protocol. The stratified protocol may be previously set. Similar to the SNMPv3 communication unit 22, the SNMPv3 communication unit 42 carries out transmission and reception by use of the SNMPv3 communication protocol in accordance with a command from the device management control unit 30. Similar to the SNMPv1 communication unit 26, the SNMPv1 communication unit 46 carries out transmission and reception by use of the SNMPv1 communication protocol in accordance with the command from the device management control unit 30.

Upon receipt of a broadcast (e.g., a broadcast email) to the effect that there is desire for acquisition of an engine ID from the computer 10, the device 12 returns its unique engine ID to the computer 10. Upon receipt of the request command for information about the device 12 from the computer 10, the device 12 transmits information about the device 12 requested by the request command to the computer 12. The information may include, for example, a product name; a model number; a year, month, and day of a replacement of toner; a year, month, and day of a replacement of a drum; a year, month, and day of a maintenance check; an installation location; an operating status; a cumulative uptime; and the like. The device 12 transmits the information to the computer 12 by use of an authentication ID and a password for the device 12; by use of either the authentication ID or the password when only one is available; or by use of neither the authentication ID nor the password when both are not available; and through the use of the SNMPv3 communication protocol. Upon receipt of the request command for the information about the device 12 from the computer 10 by use of the SNMPv1 communication protocol, the device 12 transmits information about the device 12 requested by the request command to the computer 10 by use of the SNMPv1 communication protocol.

Figure 7:
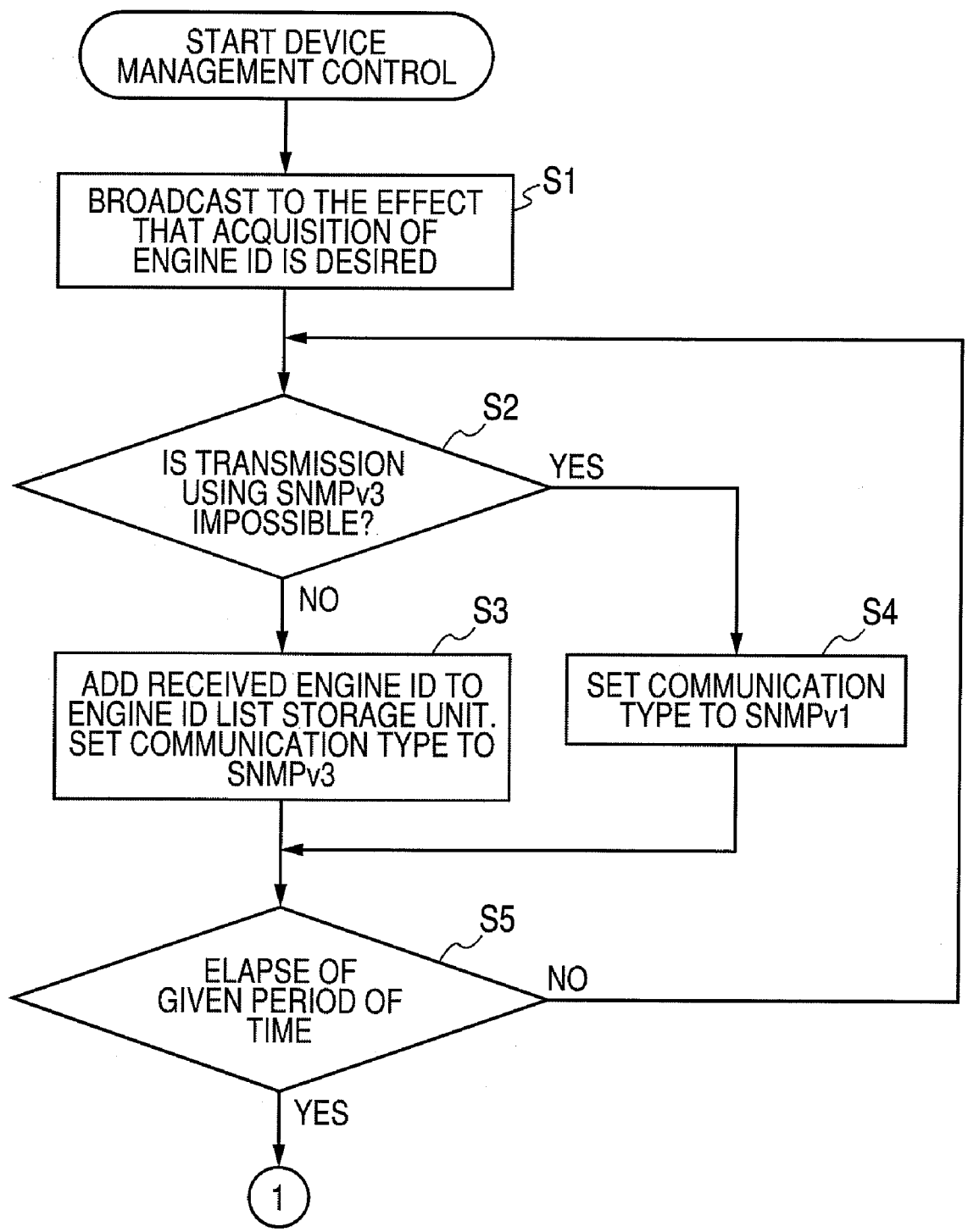
FIGS. 7 and 8 are views showing a flowchart for describing a control operation executed by the computer shown in FIG. 1.
Figure 8:
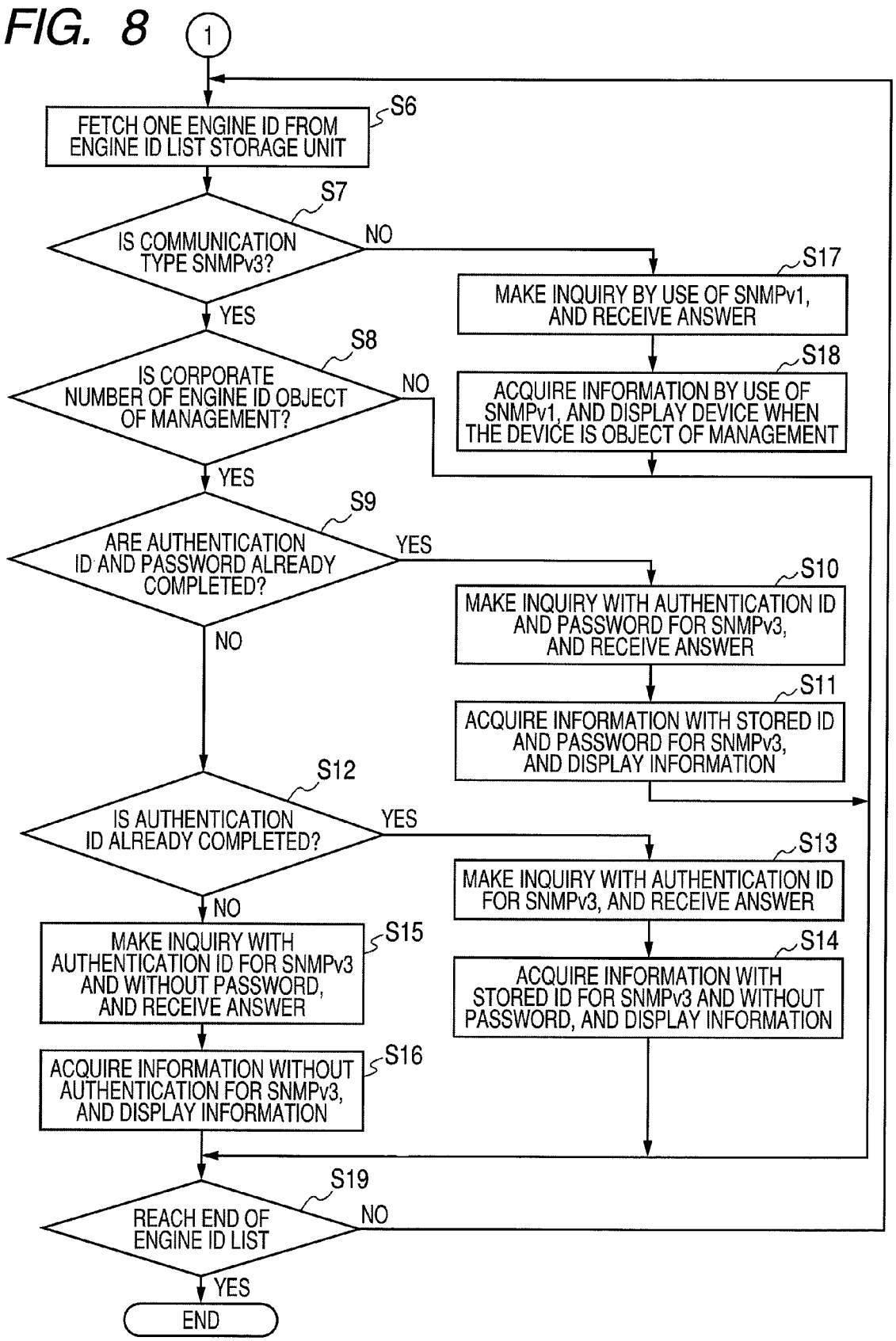
Figure 9:
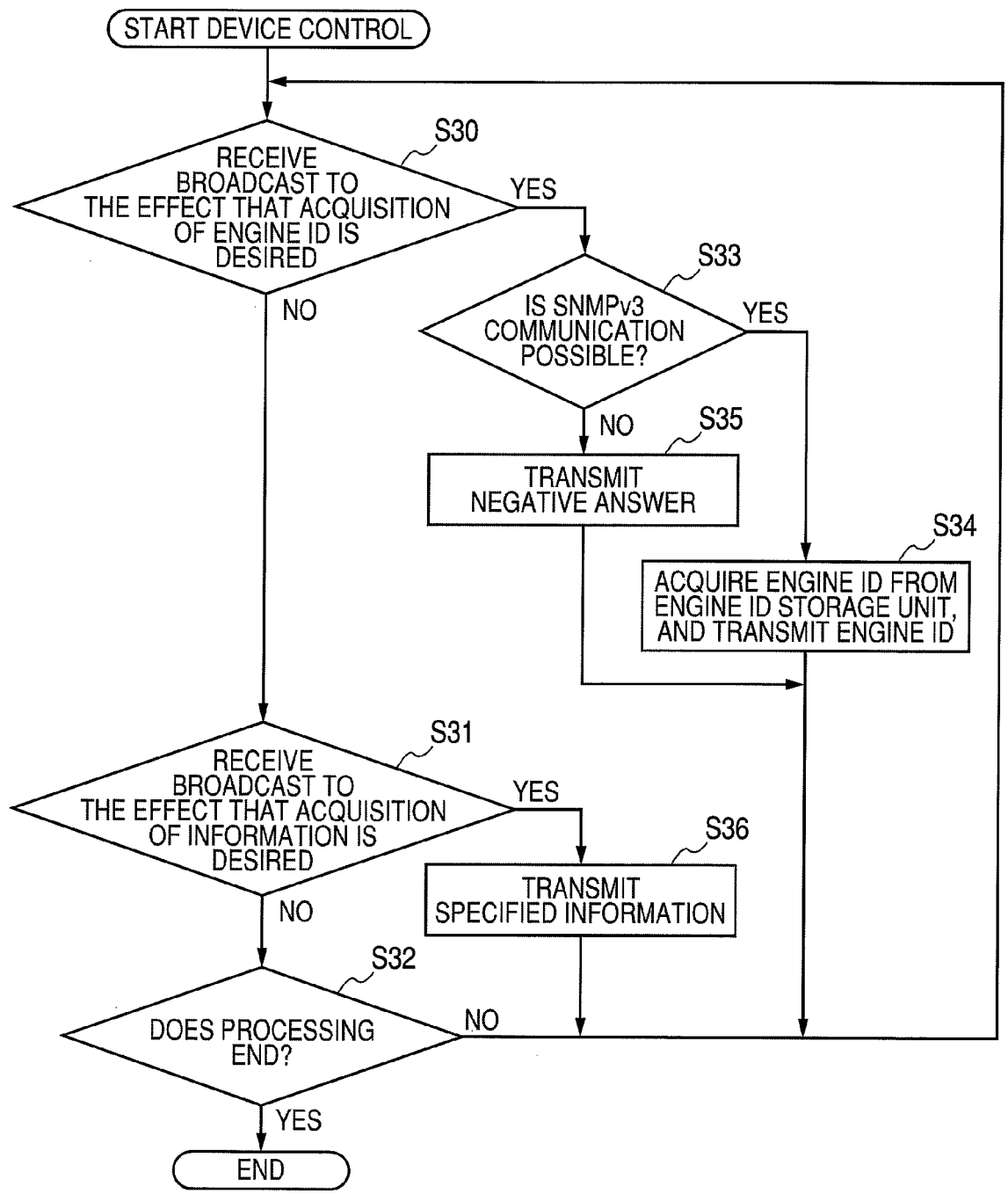
FIG. 9 is a flowchart for describing a control operation of the device shown in FIG. 1.

FIGS. 7 and 8 are flowcharts showing an example of control operation of the computer 10, and FIG. 9 is a flowchart showing an example of control operation of the device 12. The control operation of the device 12 will first be described in the following descriptions.

In FIG. 9, a determination is made, in operation S30 (hereinafter "operation" will be omitted), as to whether or not the broadcast (e.g., a broadcast email) to the effect that acquisition of an engine ID is desired is received. If it is determined that the broadcast is not received (No in S30), a determination is made, in S31, as to whether or not a request command to the effect that acquisition of information about a device is desired has been received. If it is determined that a request command has not been received (No in S31), a determination is made in S32, on the basis of operation of the device 12, as to whether or not control is completed. If it is determined that control is completed (Yes in S32), the process ends. On the other hand, if it is determined that control is not completed (No in S32), the process returns to S30.

In S30, if it's determined that a broadcast is received (Yes in S30), a determination is made in S33, on the basis of preset information, as to whether or not the device 12 itself is in a state of being able to perform transmission by use of the SNMPv3 communication protocol. If it is determined that the device 12 is in a state of being able to perform transmission by SNMPv3 (Yes in S33), an engine ID is fetched in S34 from the engine ID storage unit 44 and transmitted to the computer 10, and the process returns to S30. However, if it determined that the device 12 is not in a state of being able to perform communication by SNMPv3 (No in S33), a negative answer to the effect that transmission using the SNMPv3 communication protocol is not possible is transmitted, in S35, to the computer 10, and the process returns to S35.

In S31, if it is determined that a request command is received (Yes in S31), information designated by the request command is transmitted in S36 to the computer 10 by use of the SNMPv3 communication protocol, and the process returns to S30.

In FIGS. 7 and 8, a broadcast to the effect that acquisition of an engine ID is desired is transmitted, in S1 corresponding to transmission unit, from the computer 10 to a plurality of devices connected to the network 16. For instance, when an input signal for launching a management application that manages a device is entered by the input device 10c of the computer 10, processing shown in FIG. 7 is initiated in accordance with the input operation, whereupon processing for acquiring an engine ID is performed in S1. In the sequence diagram shown in FIG. 10, S1 shows a state achieved through the operation. The device 12 fetches an engine ID from the engine ID storage unit 44 in answer to the broadcast, and the thus-fetched engine ID is transmitted to the computer 10, as shown in S34 in FIG. 10.

Next, in S2, a determination is made as to whether or not transmission using the SNMPv3 communication protocol is possible, based on the signal received from the device 12. If it is determined that transmission by SNMPv3 is possible (No in S2), the engine ID transmitted from the device 12 is stored in S3 in the engine ID list storage unit 28. Information to the effect that a communication-type setting on the device 12 serving as a source of the engine ID is the SNMPv3 protocol is stored in the engine ID list storage unit 28 in association with information about the engine ID of that device. On the other hand, if it is determined that SNMPv3 communication is not possible (Yes in S2), information to the effect that a communication-type setting is the SNMPv1 communication protocol is stored in the engine ID list storage unit 28 in S4.

In S5, a determination is made as to whether or not a time equal to or longer than a guard time has elapsed since the broadcast was received. The guard time may be previously set. The guard time in this exemplary embodiment is about five minutes. However, another guard time may be used. If the time is less than the guard time (No in S5), the process returns to S2 and S2 and subsequent operations is repeated until the guard time has elapsed. However, if it is determined that the time is equal to or longer than the guard time (Yes in S5), one of the stored devices 12 is sequentially extracted in S6 corresponding to the engine ID list storage unit 28.

Figure 10:
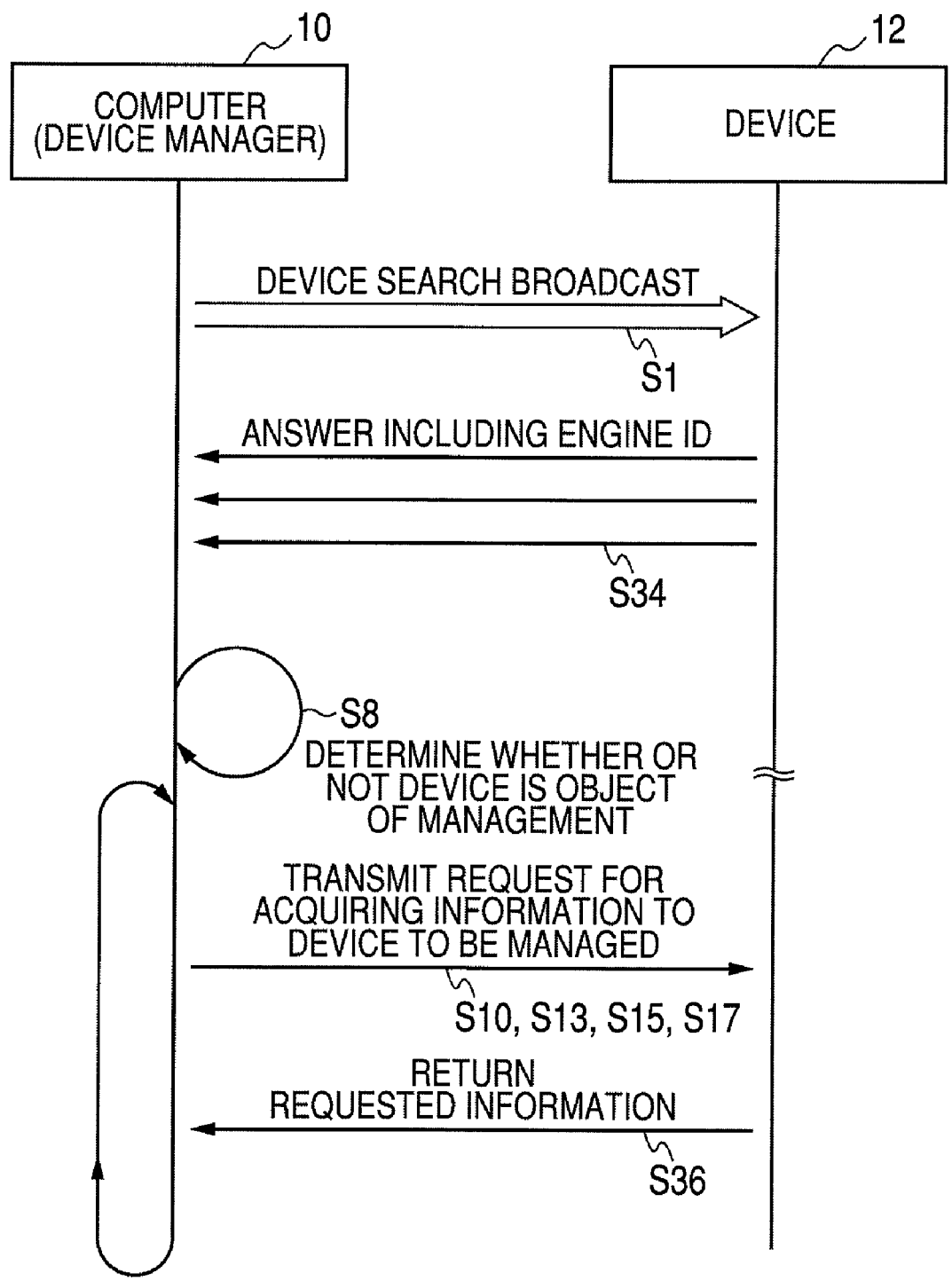
FIG. 10 is a ladder chart for describing an example of communication between the computer and the device shown in FIG. 1.

Next, in S7, a determination is made, on the basis of the specifics stored in the engine ID list storage unit 28, as to whether or not the communication type of the extracted device 12 is communication using the SNMPv3 communication protocol. If it is determined that the communication type is SNMPv3 (Yes in S7), a determination is made in S8, which corresponds to determination unit, as to whether or not the device is the device 12 to be managed on the basis of a result of a determination as to whether or not the corporate specification number included in the engine ID returned from one device 12 matches a corporate number to be taken as an object of management. I.e., the device search unit 24 performs a search. If it is determined that the device is not the device 12 to be managed (No in S8), the processing proceeds to S19, and processing pertaining to S6 and subsequent processes is repeated until an end of the engine ID list is reached. However, if it is determined in S8 that the device is the device 12 to be managed (Yes in S8), a determination is made in S9, corresponding to security setting information determination unit, on the basis of a flag in the engine ID, as to whether or not an authentication ID and a password, which are security information, are already completed for one extracted device 12. S8 in FIG. 10 shows a state achieved at this time. If it determined that the authentication ID and the password are already completed (Yes in S9) a request command for requesting information about the one device 12 is transmitted, in S10 corresponding to information acquisition unit, to the device 12 by use of the authentication ID and the password and through use of the SNMPv3 communication protocol. S10 in FIG. 10 shows a state achieved at this time. As a result of processing pertaining to S36 in FIG. 9 being performed in answer to transmission of the request command, information about the one device 12 is transmitted to the computer 10, and the information is received. Subsequently, in S11, corresponding to list preparation unit and list output unit, information about the one device 12 acquired as mentioned above is added to the list H along with symbol A showing that an authentication ID and a password are available, whereby the information is created and stored and an image of the information is further displayed on the display device 10e by way of the display unit 32.

On the other hand, if it is determined that the authentication ID and password are not already completed (No in S9), a determination is made in S12, corresponding to security setting information determination unit, on the basis of the flag in the engine ID, as to whether or not one of the authentication ID and the password which are pieces of security information; for instance, an authentication ID, is already completed in connection with the extracted one device 12. If it is determined that one of the authentication ID and the password are already completed (Yes in S12), in S13, corresponding to information acquisition unit, a request command for requesting information about the one device 12 is transmitted to the device 12 by use of the authentication ID and through use of the SNMPv3 communication protocol. S10 in FIG. 10 shows a state achieved at this time.

As a result of processing pertaining to S36 in FIG. 9 being performed in answer to transmission of the request command, information about the one device 12 is transmitted to the computer 10, and the information is received. Subsequently, in S14, corresponding to list preparation unit and list output unit, information about the one device 12 acquired as mentioned above is added to the list H along with symbol B showing that an authentication ID is available and that a password is not available, whereby the information is created and stored and an image of the information is further displayed on the display device 10e by way of the display unit 32.

If it is determined that neither the authentication ID nor the password are completed (No in S12), the request command for requesting information about the one device 12 is transmitted in S15, corresponding to information acquisition unit, to the device 12 by use of the SNMPv3 communication protocol and without use of the authentication ID and the password. S10 in FIG. 10 shows a state achieved at this time. As a result of processing pertaining to S36 in FIG. 9 being performed in answer to transmission of the request command, the information about the one device 12 is transmitted to the computer 10, and the information is received. Subsequently, in S16, corresponding to list preparation unit and list output unit, information about the one device 12 thus acquired is added to the list H along with symbol C showing that neither an authentication ID nor a password is available, whereby the information is created and stored. Further, an image of the information is displayed on the display device 10e by way of the display unit 32.

In S7, if it is determined that the SNMPv3 communication protocol is not used (No in S7), in S17, corresponding to information acquisition unit, the request command for requesting information about the one device 12 is transmitted through use of the SNMPv1 communication protocol. S10 in FIG. 10 shows a state achieved at this time. As a result of processing pertaining to S36 in FIG. 9 being performed in answer to transmission of the request command, the information about the one device 12 is transmitted to the computer 10, and the information is received. Subsequently, in S18, corresponding to list preparation unit and list output unit, information about the one device 12 thus acquired is added to the list H along with symbol D showing a communication type that does not allow use of the authentication ID and the password; namely, the SNMPv1 communication protocol, whereby the information is created and stored. Further, an image of the information is displayed on the display device 10e by way of the display unit 32.

In S19, a determination is made as to whether or not an end of the engine ID list is reached. If it is determined that an end of the engine ID list is reached (Yes in S19), processing ends. On the other hand, if it is determined that the end of the engine ID list is not reached (No in S19), processing returns to S6. In S16, the next one engine ID is fetched from a, plurality of engine IDs stored in the engine ID list storage unit 28, and processing pertaining to S7 through S16 is performed on the basis of the thus-fetched one engine ID. When all of the plurality of engine IDs stored in the engine ID list storage unit 28 are fetched in the course of repeated performance of these operations, the process is completed.

As mentioned above, in the computer (device manager) 10 of the above-described exemplary embodiment, when the engine ID is returned from the device 12, in S1 corresponding to transmission unit, in answer to performance of a broadcast to the effect that acquisition of an engine ID is desired, a determination is made, in S8 corresponding to determination unit, as to whether or not the plurality of devices are preset devices to be managed, on the basis of management information from the plurality of devices responded to the broadcast. In S10, S13, and S15 corresponding to information acquisition unit, read data (a request command) for reading information about a device is transmitted to a device to be managed by the first communication protocol, thereby acquiring information about the device that is a destination of the read data. Therefore, information about the device 12 to be managed can be quickly collected when compared with a related-art apparatus that collects information about a device to be managed from pieces of information about respective devices acquired as a result of read data (a request command) for requesting information about a device 12 being transmitted to all of the devices 12 responded to transmission of a broadcast command among the plurality of devices 12 connected to the network 16. As mentioned above, since information about the device 12 to be managed is quickly acquired, a list of information about a device to be managed is created in S13, S14, and S16 corresponding to list preparation unit. Even when an output is produced, a device management list H is quickly created and displayed. In particular, even when a device management list that is to serve as an object of management is displayed, information about a device is quickly collected, and the information is displayed as a device management list; hence, the ease of use of the manager is enhanced.

In the computer (device manager) 10 of the above-described exemplary embodiment, communication can be established with a plurality of devices 12 also by the SNMPv1 communication protocol (i.e., a second communication protocol) by means of which data are transmitted and received without authentication and encryption. In S17 corresponding to information acquisition unit, when a return email to the effect that management information is not present is returned from at least one of the plurality of devices 12 in answer to the broadcast command transmitted by means of the SNMPv3 communication protocol (i.e., a first communication protocol) in S1 corresponding to transmission unit, read data for reading information about the device is transmitted to the device that returned the email to the effect that management information is not present, by means of the SNMPv1 communication protocol (i.e., the second communication protocol), whereby information about the device 12 that is a destination of the read data is acquired. Thus, read data for reading information about the device that returned the email to the effect that management information is not present are transmitted to the device by use of the SNMPv1 communication protocol (i.e., the second communication protocol), whereby information about the device that is a destination of the read data can be acquired.

In the computer (the device manager) 10 of the above-described exemplary embodiment, communication can be established with the device 12 by use of preset security information; namely, an authentication ID and/or a password in connection with communication using the SNMPv3 communication protocol (i.e., the first communication protocol). The engine ID that is management information includes a flag showing security setting information as to whether or not the device 12 serving as a source of the engine ID requires security information in communication complying with the SNMPv3 communication protocol (i.e., the first communication protocol); namely, showing that security information is set and valid. There is included a security setting information determination unit (S9 and S12) that determines whether or not the security setting information included in the engine ID from the device 12 serving as an object of management is valid; namely, whether or not the flag showing that security information is set is in an ON position. When the security setting information determination unit determines that security setting information is valid, the information acquisition unit (S10, S13, and S15) transmits, to the device 12 serving as an object of management, the read data (the request command) for requesting a return email of information about the device by use of the security setting information. Therefore, the read data can be transmitted to, among the plurality of devices 12, the device 12 that is to become an object of management and for which the security setting information included in the management information is made valid, by use of security information and without making again an inquiry to the device 12 as to whether or not communication complying with the SNMPv3 communication protocol (the first communication protocol) uses security information. Accordingly, information about the device 12 that is to become an object of management can be quickly acquired. Further, the management information includes information as to whether or not the security setting information is valid and does not include security information; hence, security of communication complying with the first communication protocol is assured as well.

In the computer (the device manager) 10 of the above-described exemplary embodiment, the security setting information is at least one of a password and an authentication ID. Hence, the read data (the request command) can be transmitted solely to the device 12 serving as an object of management by use of at least one of the password and the authentication ID. Accordingly, information about the device 12 serving as an object of management can be quickly acquired.

The above-described exemplary embodiment of the present invention has been described in detail by reference to the drawings. However, the present invention is not limited to the above-described exemplary embodiment and can also be practiced in the form of another embodiment.

For instance, in the above-described exemplary embodiment, the SNMPv3 communication protocol is employed as the first communication protocol used for establishing communication between the computer 10 and the device 12, and the SNMPv1 communication protocol is used as the second communication protocol. However, a communication protocol other than the SNMPv3 communication protocol and the SNMPv1 communication protocol may also be used.

In the above-described exemplary embodiment, the device 12 to be managed among the plurality of devices 12 is determined as a device 12 to be managed on the basis of a result of the determination as to whether or not a corporate specification number included in the engine ID returned from each of the devices 12 matches a preset corporate number to be taken as an object of management. However, a device matching a model number, a product number, or the like, in place of the corporate number may also be taken as an object of management.

In the above-described exemplary embodiment, the network 16 is made up of two networks 16a and 16b that are connected together by means of the network device 14, such as a router and a hub. However, the network 16 may also be a single network that does not use a network device 14 or may also be constituted on a large scale from a plurality of networks; that is, three or more networks, configured by way of the plurality of network devices 14.

In the above-described exemplary embodiment, information about the respective devices 12 is acquired for each device 12. However, for instance, devices whose communication type is SNMPv1 may also be read, and information about the devices 12 may also be collectively acquired. As a result, information can be acquired more quickly. As in the above-described embodiment, when a list is generated from the devices from which information can be acquired, a list of the devices whose communication type is SNMPv1 is collectively displayed. Hence, it becomes easier to manage the communication protocols of the devices.

In the above-described exemplary embodiment, a list is sequentially generated from the device from which information can be acquired, and the list is displayed. However, it may also be possible to acquire information from all of the devices 12; to generate a list; and to display the list.

According to exemplary embodiments of the present invention, there is provided an intra-network device manager that can establish communication with a device by way of a network by means of a first communication protocol that enables transmission and reception of authenticated and encrypted data. The manager comprises a transmission unit that transmits, to a plurality of devices connected to the network, a broadcast command for requesting management information unique to a device for use in communication complying with the first communication protocol stored in each of the devices; a determination unit that determines whether the plurality of devices are preset devices to be managed, on the basis of the management information from the plurality of devices responded to the transmitted broadcast command; and an information acquisition unit that acquires information about a device that is a destination of read data, by transmitting, to the device determined by the determination unit as an object of management among the plurality of devices, the read data for reading information about the device by means of the first communication protocol.

According to exemplary embodiments of the present invention, there is also provided an intra-network device management program for a computer that can establish communication with a device by way of a network by means of a first communication protocol that enables transmission and reception of authenticated and encrypted data. The program modifies the computer to implement a transmission unit that transmits, to a plurality of devices connected to the network, a broadcast command for requesting management information unique to a device for use in communication complying with the first communication protocol stored in each of the devices; a determination unit that determines whether or not the plurality of devices are preset devices to be managed, on the basis of the management information from the plurality of devices responded to the transmitted broadcast command; and an information acquisition unit that acquires information about a device that is a destination of read data, by transmitting, to the device determined by the determination unit as an object of management among the plurality of devices, the read data for reading information about the device by means of the first communication protocol.

According to exemplary embodiments of the present invention, a determination is made, on the basis of management information from a plurality of devices responded to a broadcast command, as to whether the plurality of devices are preset devices to be managed. Read data for reading information about a device to be managed is transmitted by a first communication protocol, thereby acquiring information about the device that is a destination of the read data. Therefore, information about a device to be managed can be quickly collected when compared with a related-art apparatus that collects information about a device to be managed from pieces of information about respective devices acquired as a result of read data being transmitted to all of the devices responded to transmission of a broadcast command among the plurality of devices connected to the network.

The intra-network device manager and the intra-network device management program may enable establishment of communication with the plurality of devices also by a second communication protocol by means of which data are transmitted and received without authentication and encryption; and, when at least one of the plurality of devices returns an email to the effect that management information is not present in answer to the broadcast command transmitted by the transmission unit, the information acquisition unit transmits read data for reading information about a device to the device that returned the mail to the effect that management information is not present, by means of the second communication protocol, thereby acquiring information about the device that is a destination of the read data. Read data for reading information about a device that returned a mail to the effect that management information is not present are sent to the device; namely, the device that does not comply with communication conforming to the first communication protocol, by use of the second communication protocol, thereby acquiring information about the device that is a destination of the read data.

Moreover, the intra-network device manager and the intra-network device management program may enable performance of communication on the basis of the device and preset security information in connection with communication complying with the first communication protocol, and the management information may include security setting information used for determining whether a device serving as source of management information requires security information in communication complying with the first communication protocol. There is included a security setting information determination unit that determines whether or not the security setting information included in the management information from the device to be managed is valid; and, when the security setting information determination unit determines that the security setting information is valid, the information acquisition unit transmits the read data to the device to be managed by use of the security setting information. The read data can be transmitted to a device, which is to become an object of management and for which security setting information included in management information is made valid, among a plurality of devices by use of the security setting information. Therefore, it is not necessary to make an inquiry again to a device as to whether or not security setting information of the device that is to be an object of management is valid, and information about the device to be managed can be quickly acquired.

Furthermore, in the intra-network device manager and the intra-network device management program, the security setting information may be at least one of a password and an authentication ID. Since the read data can be transmitted solely to the device that is to become an object of management by use of at least one of the password and the authentication ID, information about a device to be managed can be quickly acquired.

Moreover, the intra-network device manager and the intra-network device management program may further include an operation unit that receives an operation instruction; a list preparation unit that prepares a device management list showing information about a device serving as the object of management acquired by the information acquisition unit; and a list display unit that displays the device management list prepared by the list preparation unit. The transmission unit, the determination unit, the information acquisition unit, the list preparation unit, and the list display unit are implemented when the operation unit receives operation for displaying a device management list. Therefore, processing from receipt of operation by user until display of a device management list can be quickly performed.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:
1. A device manager comprising:
a transmission unit that transmits, to a plurality of devices connected to a network, a broadcast command which requests management information that is stored in and unique to each device for use in communication using a first communication protocol that enables communication using authenticated and encrypted data;
a receiving unit that receives a response from the plurality of devices in response to the broadcast command, wherein the plurality of devices comprises at least one device having a device-unique management information and at least one device not having device-unique management information;
a determination unit that determines whether the plurality of devices are devices to be managed, on the basis of the management information received from the plurality of devices in response to the broadcast command, wherein the determination unit executes a determination process on each of the at least one device having the device-unique management information;
an information acquisition unit that transmits, using the first communication protocol, to the devices determined by the determination unit to be devices to be managed among the plurality of devices, read data for reading information about the device, thereby acquiring information about each of the devices to be managed, and that collectively transmits the read data to all devices not having device-unique management information, using a second communication protocol that does not use authenticated and encrypted data, thereby collectively acquiring information about each of the at least one device having no device-unique management information;
a list preparation unit that prepares a device management list showing information acquired by the information acquisition unit about the devices to be managed; and
a list display unit that displays the device management list prepared by the list preparation unit,
wherein, of the information about devices acquired by the information acquisition unit, the list preparation unit prepares the device management list of all the devices whose information is acquired using the first protocol, and prepares the device management list of the devices whose information is acquired using the second protocol only for the devices to be managed.

2. The device manager according to claim 1, wherein the management information comprises security setting information used for determining whether a device which is a source of the management information uses security information in communicating using the first communication protocol, and
wherein the device manager further comprises a security setting information determination unit that determines whether the security setting information is valid and, if the security setting information determination unit determines that the security setting information is valid, the information acquisition unit transmits the read data to the device using the security setting information.

3. The device manager according to claim 2, wherein the security information comprises at least one of a password and an authentication ID.

4. The device manager according to claim 1, further comprising:
an operation unit that receives an operation instruction, wherein
the transmission unit, the determination unit, the information acquisition unit, the list preparation unit, and the list display unit are implemented in response to the operation instruction.

5. A non-transitory computer readable medium storing a device management program for a computer, the device management program modifying the computer to implement:

a transmission unit that transmits, to a plurality of devices connected to a network, a broadcast command which requests management information that is stored in and unique to each device for use in communication using a first communication protocol that enables communication using authenticated and encrypted data;
a receiving unit that receives a response from the plurality of devices in response to the broadcast command, wherein the plurality of devices comprises at least one device having a device-unique management information and at least one device not having device-unique management information; a determination unit that determines whether the plurality of devices are devices to be managed, on the basis of the management information received from the plurality of devices in response to the broadcast command, wherein the determination unit executes a determination process on each of the at least one device having the device-unique management information;
an information acquisition unit that transmits, using the first communication protocol, to the devices determined by the determination unit to be devices to be managed among the plurality of devices, read data for reading information about the device, thereby acquiring information about each of the devices to be managed, and that collectively transmits the read data to all devices not having device-unique management information, using a second communication protocol that does not use authenticated and encrypted data, thereby collectively acquiring information about each of the at least one device having no device-unique management information;
a list preparation unit that prepares a device management list showing information acquired by the information acquisition unit about the devices to be managed; and
a list display unit that displays the device management list prepared by the list preparation unit,
wherein, of the information about devices acquired by the information acquisition unit, the list preparation unit prepares the device management list of all the devices whose information is acquired using the first protocol, and prepares the device management list of the devices whose information is acquired using the second protocol only for the devices to be managed.

6. The non-transitory computer readable medium according to claim 5, wherein when at least one of the plurality of devices responds that management information is not present in answer to the broadcast command transmitted by the transmission unit, the information acquisition unit transmits the read data to the at least one device using a second communication protocol that does not use authentication and encryption, thereby acquiring the information about the at least one device.

7. The non-transitory computer readable medium according to claim 5, wherein the management information comprises security setting information used for determining whether a device which is a source of the management information uses security information in communicating using the first communication protocol, and
wherein the device management program further modifies the computer to implement a security setting information determination unit that determines whether the security setting information is valid and, if the security setting information determination unit determines that the security setting information is valid, the information acquisition unit transmits the read data to the device using the security setting information.

8. The non-transitory computer readable medium according to claim 7, wherein the security information comprises at least one of a password and an authentication ID.

9. The non-transitory computer readable medium according to claim 5, wherein the device management program further modifies the computer to implement:

an operation unit that receives an operation instruction, wherein the transmission unit, the determination unit, the information acquisition unit, the list preparation unit, and the list display unit are implemented in response to the operation instruction.

* * * * *